(12) United States Patent
Kim

(10) Patent No.: US 9,564,626 B2
(45) Date of Patent: Feb. 7, 2017

(54) RECHARGEABLE BATTERY

(71) Applicant: SAMSUNG SDI CO., LTD., Yongin-si, Gyeonggi-do (KR)

(72) Inventor: Seung-Mo Kim, Yongin-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 398 days.

(21) Appl. No.: 14/156,632

(22) Filed: Jan. 16, 2014

(65) Prior Publication Data

US 2014/0349149 A1 Nov. 27, 2014

(30) Foreign Application Priority Data

May 22, 2013 (KR) .................. 10-2013-0057781

(51) Int. Cl.
  *H01M 2/26* (2006.01)
  *H01M 2/20* (2006.01)
  *H01M 2/34* (2006.01)

(52) U.S. Cl.
  CPC .............. *H01M 2/263* (2013.01); *H01M 2/20* (2013.01); *H01M 2/26* (2013.01); *H01M 2/348* (2013.01); *H01M 2200/103* (2013.01)

(58) Field of Classification Search
  CPC .......... H01M 2/26; H01M 2/263; H01M 2/20
  USPC ........................................ 429/61
  See application file for complete search history.

(56) References Cited

U.S. PATENT DOCUMENTS

| 2012/0094170 A1 | 4/2012 | Byun et al. |
| 2012/0196166 A1 | 8/2012 | Kim |
| 2012/0263976 A1 | 10/2012 | Byun et al. |
| 2013/0084471 A1 | 4/2013 | Han et al. |
| 2013/0095372 A1 | 4/2013 | Kim et al. |
| 2013/0101870 A1* | 4/2013 | Byun .................. H01M 2/348 429/7 |

FOREIGN PATENT DOCUMENTS

| KR | 10-2012-0039976 A | 4/2012 |
| KR | 10-2012-0086835 | 8/2012 |
| KR | 10-2012-0118315 | 10/2012 |
| KR | 10-2013-0035163 A | 4/2013 |
| KR | 10-2013-0040114 A | 4/2013 |

OTHER PUBLICATIONS

Korean Office Action dated May 20, 2016 in Corresponding Korean Patent Application No. 10-2013-0057781.
Korean Office Action dated Nov. 28, 2016 in Corresponding Korean Patent Application No. 10-2013-0057781.

* cited by examiner

*Primary Examiner* — Basia Ridley
*Assistant Examiner* — James Erwin
(74) *Attorney, Agent, or Firm* — Lee & Morse, P.C.

(57) ABSTRACT

A rechargeable battery includes a case having an inner space, a first electrode assembly inside the case, a second electrode assembly inside the case, a current collecting member including a first current collecting piece electrically connected to an electrode of the first electrode assembly and a second current collecting piece electrically connected to an electrode of the second electrode assembly, the electrode of the second electrode assembly having a same polarity as the electrode of the first electrode assembly, a first terminal electrically connected to the first current collecting member and protruding outside the case, wherein the first current collecting piece and the second current collecting piece have different lengths.

9 Claims, 5 Drawing Sheets

RECHARGEABLE BATTERY

CROSS-REFERENCE TO RELATED APPLICATION

Korean Patent Application No. 10-2013-0057781, filed on May 22, 2013, in the Korean Intellectual Property Office, and entitled: "Rechargeable Battery," is incorporated by reference herein in its entirety.

BACKGROUND

1. Field

Embodiments relate generally to a rechargeable battery. More particularly, embodiments relate generally to a rechargeable battery with a current collecting member.

2. Description of the Related Art

A rechargeable battery can be repeatedly charged and discharged, unlike a primary battery that is incapable of being recharged. A rechargeable battery of a low capacity is used for a small portable electronic device such as a mobile phone, a laptop computer, or a camcorder. A large capacity battery is widely used as a power source for driving a motor of a hybrid vehicle, etc.

SUMMARY

Embodiments are directed to a rechargeable battery including a case having an inner space, a first electrode assembly inside the case, a second electrode assembly inside the case, a current collecting member including a first current collecting piece electrically connected to an electrode of the first electrode assembly and a second current collecting piece electrically connected to an electrode of the second electrode assembly, the electrode of the second electrode assembly having a same polarity as the electrode of the first electrode assembly, and a first terminal electrically connected to the first current collecting member and protruding outside the case. The first current collecting piece and the second current collecting piece have different lengths.

The first current collecting piece may be shorter than the second current collecting piece.

The first electrode assembly and the second electrode assembly may be arranged according to a length direction of the first current collecting piece.

The first electrode assembly and the second electrode assembly may be separated from each other in a length direction of the first current collecting piece.

The first electrode assembly may be closer to the first terminal than the second electrode assembly.

The first current collecting piece may have a first electrode bonding part bonded to the first electrode assembly. The second current collecting piece has a second electrode bonding part bonded to the second electrode assembly. The second electrode bonding part is positioned downward from the first electrode bonding part.

The current collecting member may include a terminal connection part connected to the first terminal. The first current collecting piece and the second current collecting piece may be bent at the terminal connection part.

The first current collecting piece may include a first side connection part bent at the terminal connection part. A first electrode bonding part bent at one side end of the first side connection part and bonded to the first electrode assembly by welding.

The terminal connection part may include a first fuse part and a second fuse part. The first current collecting piece may be connected to the terminal connection part with the first fuse part being between the first current collecting piece and the terminal connection part. The second current collecting piece may be connected to the terminal connection part with the second fuse part being between the second current collecting piece and the terminal connection part.

The second current collecting piece may include a second side connection part bent at the terminal connection part, a lead supporting part bent at a side end of the second side connection part, a guide supporting part protruding toward the first current collecting piece at a lower end of the lead supporting part, and a second electrode bonding part bent at a side end of the guide supporting part and bonded to the second electrode assembly.

The second current collecting piece may include a second side connection part bent at the terminal connection part, a guide supporting part protruding in a direction toward the first current collecting piece at the second side connection part, and a second electrode bonding part bent at the guide supporting part and bonded at the second electrode assembly.

The first current collecting piece may include a first side connection part bent at the terminal connection part and continuing downwardly, a guide supporting part obliquely bent at a lower end of the first side connection part in a lower side, and a first electrode bonding part bent at a lower end of the guide supporting part and bonded to the first electrode assembly.

The second current collecting piece may include a second side connection part bent downwardly at the terminal connection part, a guide supporting part obliquely bent at the lower end of the second side connection part in the lower side, and a second electrode bonding part bent at the lower end of the guide supporting part and bonded to the second electrode assembly.

The first current collecting piece and the second current collecting piece may face each other.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
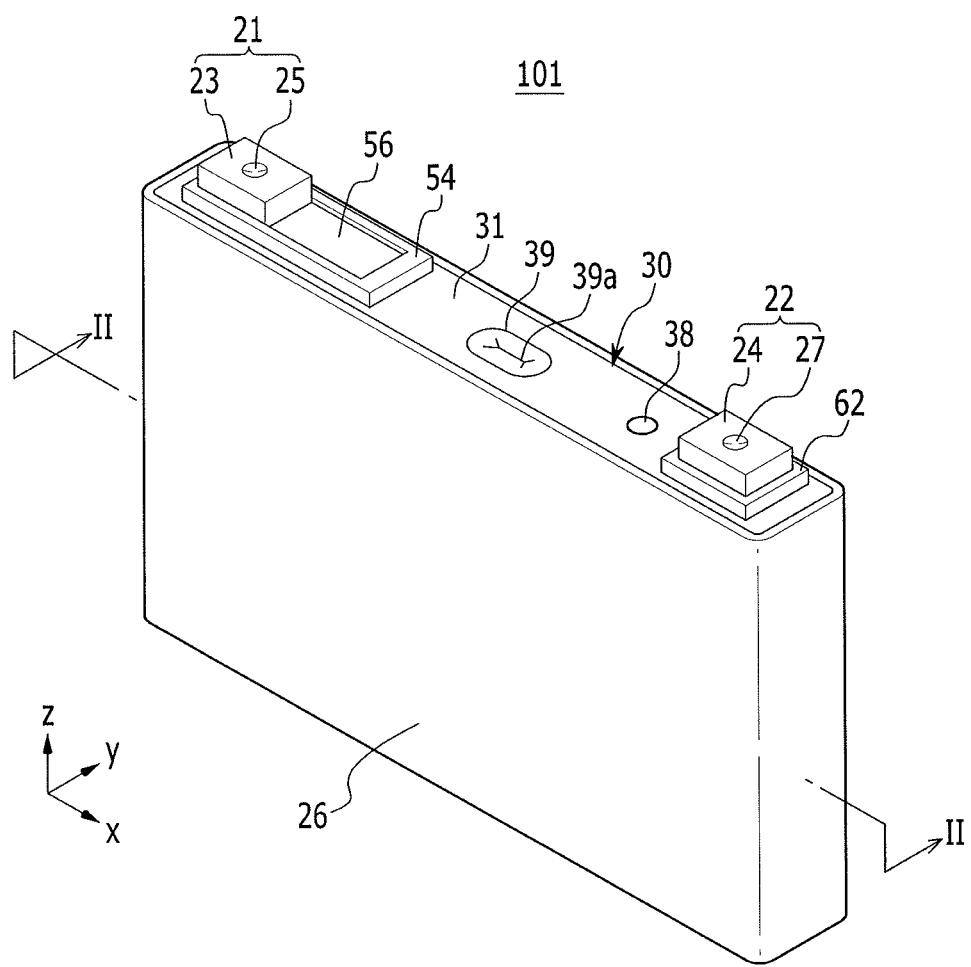
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 2:
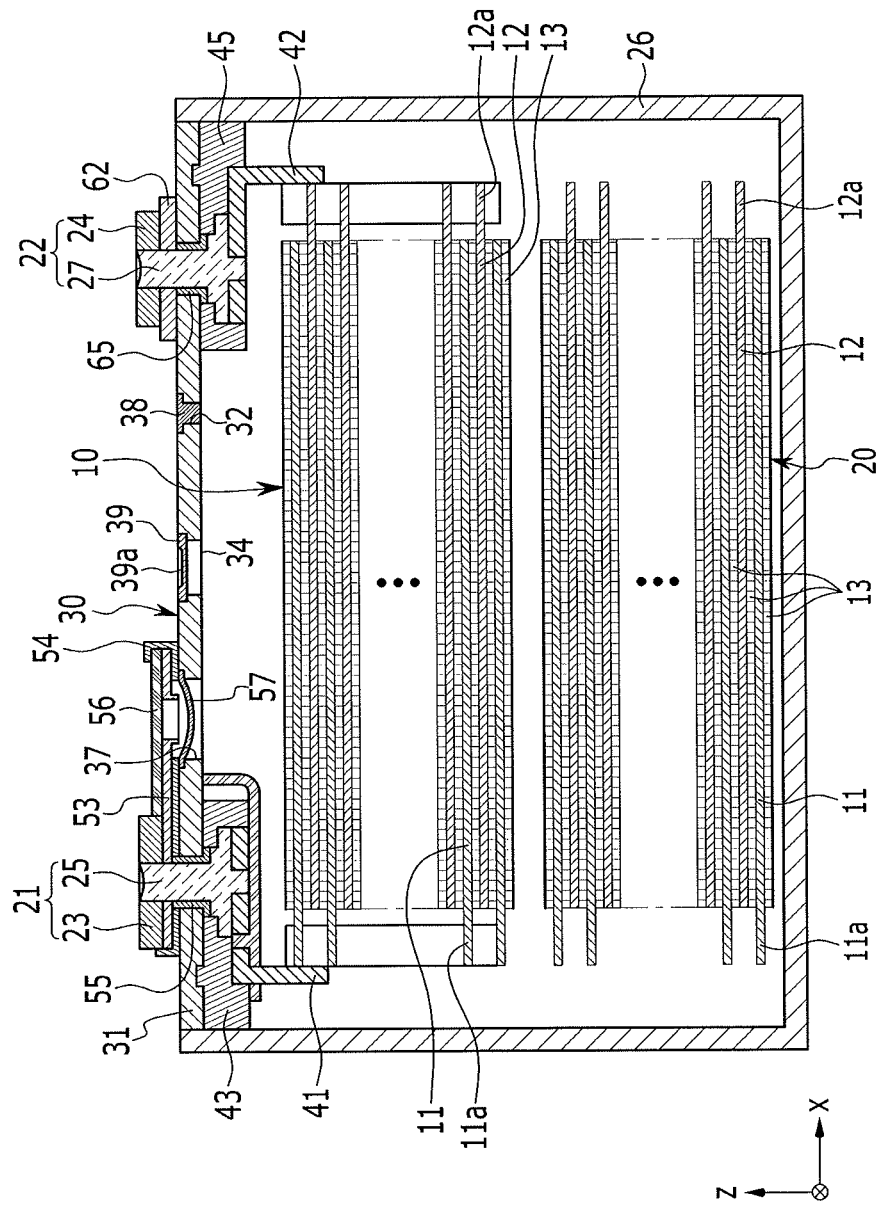
FIG. 2 illustrates a cross-sectional view taken along the line II-II of FIG. 1.

FIG. 1 illustrates a perspective view of a rechargeable battery according to an exemplary embodiment and FIG. 2 illustrates a cross-sectional view of FIG. 1, taken along the line II-II.

Referring to FIG. 1 and FIG. 2, a rechargeable battery 101 according to this exemplary embodiment includes a first electrode assembly 10 and a second electrode assembly 20, each being formed by winding a negative electrode 11 and a positive electrode 12, interposing a separator 13 therebetween, a case 26 in which the first electrode assembly 10 and the second electrode assembly 20 are installed, and a cap assembly 30 coupled to an opening of the case 26.

The rechargeable battery 101 according to this exemplary embodiment is exemplarily described as a lithium ion secondary battery having a prismatic shape. It is to be understood that the rechargeable battery 101 may be of various other types or have various other shapes. For example, the rechargeable battery 101 may be a lithium polymer battery or a cylindrical battery.

The negative electrode 11 and the positive electrode 12 include coated regions where an active material is coated onto a current collector formed of a thin metal foil, and uncoated regions 11a and 12a where the active material is not coated.

The negative electrode uncoated region 11a is formed at one side end of the negative electrode 11 along a length direction of the negative electrode 11, and the positive uncoated region 12a is formed at the other side end of the positive electrode 12 along a length direction of the positive electrode 12. The negative electrode 11 and the positive electrode 12 may be spirally wound with respect to a winding axis, with the separator 13 interposed therebetween. The separator 13 may be an insulator.

The first electrode assembly 10 and the second electrode assembly 20 may be spiral-wound and flatly pressed, and may be inserted and disposed in the case 26 such that the negative uncoated region 11a and positive electrode uncoated region 12a are positioned at the side end and the winding axis is parallel to a cap plate 31.

The first electrode assembly 10 and the second electrode assembly 20 may be disposed with respect to each other in a height direction (a z-axis direction) of the case 26. Herein, the terms "height direction of the case 26" or "z-axis direction" refer to a direction toward or away from the cap plate 31.

The first electrode assembly 10 is disposed to be closer to a first terminal 21 than the second electrode assembly 20. The first electrode assembly 10 and the second electrode assembly 20 are separated from each other and disposed with respect to each other in the height direction of the case 26.

The first current collecting piece 413 and a second current collecting piece 414 may be continuously formed in the height direction of the case 26. The first electrode assembly 10 and the second electrode assembly 20 may be arranged according to the length direction of the first current collecting piece 413 and disposed in parallel. Accordingly, outer surfaces of the first electrode assembly 10 and the second electrode assembly 20 may be positioned on the same plane surface.

Also, the first electrode assembly 10 and the second electrode assembly 20 may be disposed to be separated from each other in the length direction of the first current collecting piece 413.

The case 26 may be formed to have a substantially cuboidal shape, and an opening may be formed on one side of the case 26. The cap assembly 30 may include the cap plate 31 covering the opening of the case 26, the first terminal 21 that protrudes outside the cap plate 31 and is electrically connected to the negative electrode 11, a second terminal 22 that protrudes outside the cap plate 31 and is electrically connected to the positive electrode 12, and a vent member 39 having a notch 39a so as to be broken according to a predetermined internal pressure.

The cap plate 31 may be formed in the shape of a plate extending in one direction and may be coupled to the opening of the case 26. The cap plate 31 may include a sealing plug 38 installed at an electrolyte injection opening 32. The first terminal 21 and the second terminal 22 may installed to protrude from a top part of the cap plate 31.

The first terminal 21 may be electrically connected to the negative electrode 11 with a current collecting member 41 as a medium, and the second terminal 22 may be electrically connected to the positive electrode 12 with a current collecting member 42 as a medium. In other implementations, the first terminal 21 may be electrically connected to the negative electrode, and the second terminal 22 may be electrically connected to the positive electrode.

The first terminal 21 may include an outer terminal 23 exposed to the outside and a connection terminal 25 bonded to the current collecting member 41 to pass through the outer terminal 23. The outer terminal 23 may be formed to have a plate shape. The connection terminal 25 may pass through the cap plate 31 and the outer terminal 23, and an upper end thereof may be fixed to the outer terminal 23.

A gasket 55 for sealing may be inserted and installed in a hole through which the connection terminal 25 passes between the cap plate 31 and the connection terminal 25. A lower insulating member 43 may be installed under an inner side of the cap plate 31 such that the first terminal 21 and the current collecting member 41 are insulated from the cap plate 31.

A short-circuit tab 53 may be installed on the cap plate 31 and electrically connected to the first terminal 2. An upper insulating member 54 for electrically insulating the short-circuit tab 53 and the cap plate 31 may be installed between the short-circuit tab 53 and the cap plate 31. The outer terminal 23 may be positioned at one side on the short-circuit tab 53 and a cover 56 may be installed at the other side on the short-circuit tab 53.

The cap assembly 30 may include a short-circuit member 57 for short-circuiting the negative electrode 11 and the positive electrode 12. The short-circuit member 57 may be electrically connected with the cap plate 31 electrically connected with the negative electrode 11. If the internal pressure of the rechargeable battery 101 increases, the short-circuit member 57 is deformed and thus connects with the short-circuit tab 53 that is electrically connected with the positive electrode 12.

A short-circuit hole 37 may be formed in the cap plate 31, and the short-circuit member 57 may be disposed between the upper insulation member 54 and the cap plate 31 in the short-circuit hole 37. The short-circuit member 57 may be formed to include an arc-shaped portion that bends convexly downward and an inverse plate having an edge fixed to the cap plate 31.

The second terminal 22 may include an outer terminal 24 and a connection terminal 27 that are exposed to the outside. The outer terminal 24 may be formed to have a plate shape. The connection terminal 27 may be fixed to the outer terminal 24 after passing through the outer terminal 23.

The connection terminal 27 may be welded to the current collecting member 42 and may penetrate the cap plate 31 such that an upper portion of the connection terminal 27 contacts the outer terminal 24 and is then fixed thereto. A gasket 65 for sealing between the connection terminal 27 and the cap plate 31 may be inserted into a hole through which the connection terminal 27 penetrates. A lower insulation member 45 may be provided under the cap plate 31 for insulation of the connection terminal 27 and the current collecting member 42 from the cap plate 31.

A connection plate 62 that electrically connects the second terminal 22 and the cap plate 31 may be provided in the second terminal 22. Accordingly, the cap plate 31 may be electrically connected to the positive electrode to be positively charged.

Figure 3:
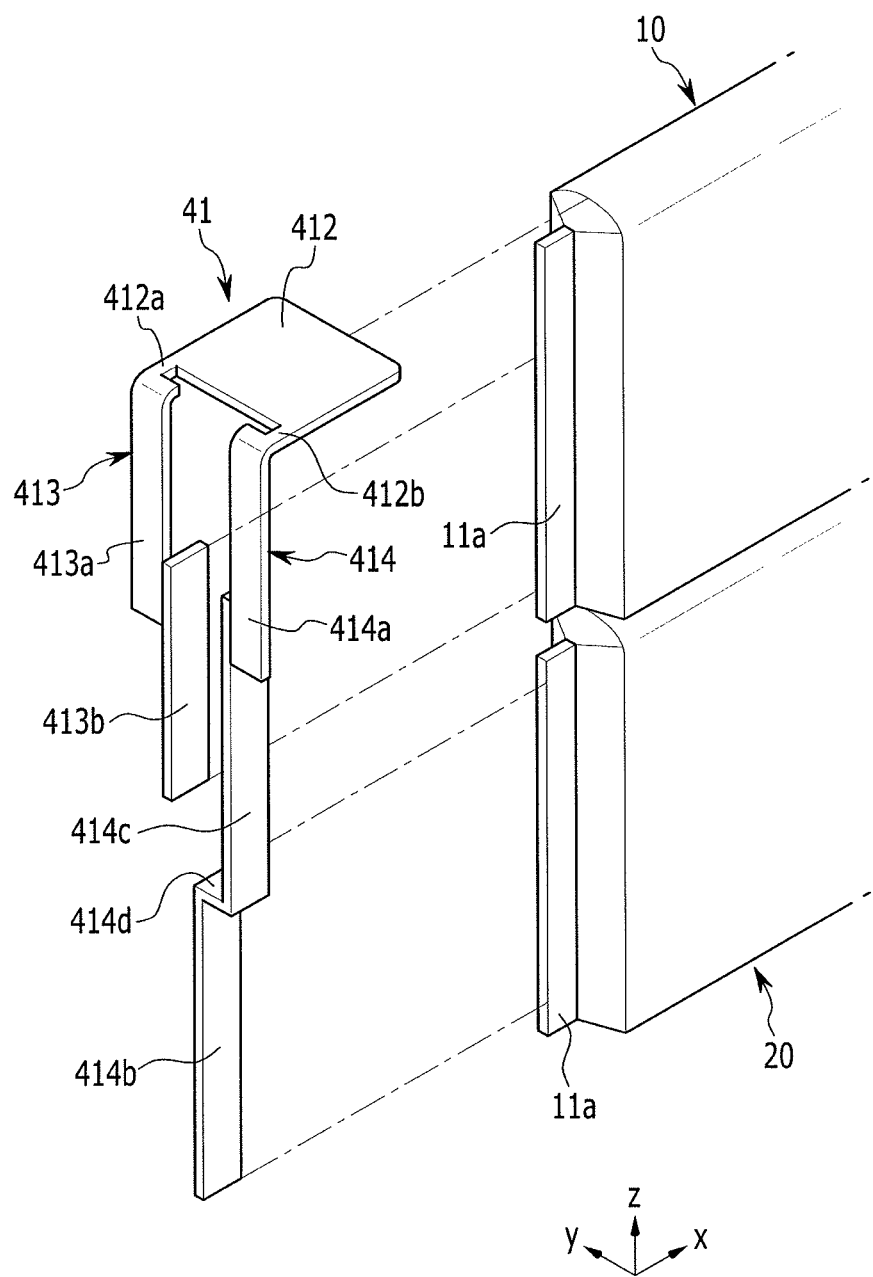
FIG. 3 illustrates an exploded perspective view of a current collecting member and an electrode assembly of the rechargeable battery according to an exemplary embodiment.

FIG. 3 illustrates an exploded perspective view of a current collecting member and an electrode assembly of a rechargeable battery according to an exemplary embodiment.

The first terminal 21 may be electrically connected to the negative electrode 11 through the current collecting member 41 and the second terminal 22 may be electrically connected to the positive electrode 12 through the current collecting member 42.

The current collecting member 41 connected to the first terminal 21 and the current collecting member 42 connected to the second terminal 22 may have the same structure such that the description for the current collecting member 41 connected to the first terminal 21 may also be the description for the current collecting member 42 connected to the second terminal 22.

The current collecting member 41 includes a terminal connection part 412 bonded to the connection terminal 25, a first current collecting piece 413 that is bent at the terminal connection part 412, continues downwardly, and is fixed to the negative uncoated region 11a of the first electrode assembly 10, and a second current collecting piece 414 that is bent at the terminal connection part 412, continues downwardly (that is, in the z direction away from the cap plate 31, and is fixed to the negative uncoated region 11a of the second electrode assembly 20.

The terminal connection part 412 may be formed to have a quadrangular plate shape and may be fixed under the connection terminal 25 by welding. At a portion where the terminal connection part 412 and the first current collecting piece 413 are connected, a first fuse part 412a may be formed. At a portion where the terminal connection part 412 and the second current collecting piece 414 are connected, a second fuse part 412b may be formed.

The first current collecting piece 413 and the second current collecting piece 414 may be bent downward at one end of the terminal connection part 412 and may continue in the height direction (the z-axis direction) of the case 26. The first current collecting piece 413 and the second current collecting piece 414 may be separated in the width direction of the current collecting pieces 413 and 414.

The first fuse part 412a may have a smaller cross-section than other portions of the terminal connection part 412 and first current collecting piece 413 such that the first fuse part 412a may be easily melted when if an overcurrent occurs. The first fuse part 412a may connect the terminal connection part 412 and the first current collecting piece 413 such that the electrical connection of the current collecting member 41 and the first electrode assembly 10 is disconnected if the first fuse part 412a is melted.

The second fuse part 412b may have a smaller cross-section than other portions of the terminal connection part 412 and the second current collecting piece 414 such that the second fuse part 412 b may be easily melted if an overcurrent occurs. The second fuse part 412b may connect the terminal connection part 412 and the second side connection part 414a such that the electrical connection of the current collecting member 41 and the second electrode assembly 20 is disconnected if the second fuse part 412b is melted.

The first current collecting piece 413 may be formed to be shorter than the second current collecting piece 414. The first current collecting piece 413 may be bonded to the first electrode assembly 10 positioned to be closer to the cap plate 31. The first current collecting piece 413 may include a first side connection part 413a that is bent at the terminal connection part 412 and continues downwardly, and a first electrode bonding part 413b that is bent at one side end of the first side connection part 413a and is bonded to the negative uncoated region 11a of the first electrode assembly 10. In the state that the first electrode bonding part 413b is bent at the first side connection part 413a at a right angle and is disposed parallel to the negative uncoated region 11a of the first electrode assembly 10, the first electrode bonding part 413b may be bonded to the negative uncoated region 11a by a method such as ultrasonic welding.

The second current collecting piece 414 is formed to be longer than the first current collecting piece 413. The second current collecting piece 414 may be bonded to the second electrode assembly 20 at a greater distance from the cap plate 31 from where the first current collecting piece is bonded to the first electrode assembly. The second current collecting piece 414 may include a second side connection part 414a that is bent at the terminal connection part 412 and continues downwardly, and a second electrode bonding part 414b connected to the second side connection part 414a and bonded to the negative uncoated region 11a of the second electrode assembly 20.

The second electrode bonding part 414b may be connected to the second side connection part 414a through the lead supporting part 414c and the guide supporting part 414d. The lead supporting part 414c may be bent at the second side connection part 414a at a right angle, may be disposed parallel to the negative uncoated region 11 a of the second electrode assembly 20, and may continue in a direction toward the bottom of the case 26. Here, the term "bottom of the case 26" refers to a surface of the case 26 facing the cap plate 31, for example, a surface that is on an opposite end of the rechargeable battery 101 from the cap plate.

The guide supporting part 414d may be bent at a right angle toward the first current collecting piece 413 from the lead supporting part 414c. The guide supporting part 414d may function to shift the position of the second electrode bonding part 414b inside the case 26 such that the second electrode bonding part 414b contacts the negative uncoated region 11a of the second electrode assembly 20.

The second electrode bonding part 414b may be bent to continue from the guide supporting part 414d toward the bottom of the case 26, in the state that it is disposed parallel to the negative uncoated region 11a of the second electrode assembly 20. The second electrode bonding part 414b may be bonded to the negative uncoated region 11a by ultrasonic welding, etc.

As described above, according to the present exemplary embodiment, although a plurality of electrode assemblies 10 and 20 are disposed in the case 26, the electrode assemblies 10 and 20 do not overlap and are separated in the height direction of the case 26 and disposed parallel to each other. If a foreign conductive material such as a nail or the like were to penetrate inside the case 26, the foreign conductive material would likely only penetrate one of the electrode assemblies 10 and 20. Accordingly, compared with a situation in which two electrode assemblies 10 and 20 are penetrated, in the present embodiment, a short-circuit current flowing through the foreign material may be largely decreased.

The separated first current collecting piece 413 and second current collecting piece 414 may be respectively connected to the electrode assemblies 10 and 20 and the current collecting pieces 413 and 414 may be connected to the terminal connection part 412 with the fuse parts 412a and 412b such that only the current collecting piece connected thereto is disconnected from the terminal if an overcurrent occurs in one of the electrode assemblies 10 and 20. For example, if the conductive foreign material were to penetrate the case 26, an inner short-circuit could generated at the second electrode assembly 20 and an overcurrent could flow through the second electrode assembly 20 such that the second fuse part 412b could be melted and the first terminal 21 and the second electrode assembly 20 could be disconnected. In this case, the first fuse part 412a would not be melted and the first electrode assembly 10 and the first terminal 21 may remain connected.

As described above, according to the present exemplary embodiment, if a conductive foreign material penetrates from the outside, only one electrode assembly is short-circuited and the short-circuited electrode assembly may be blocked.

Figure 4:
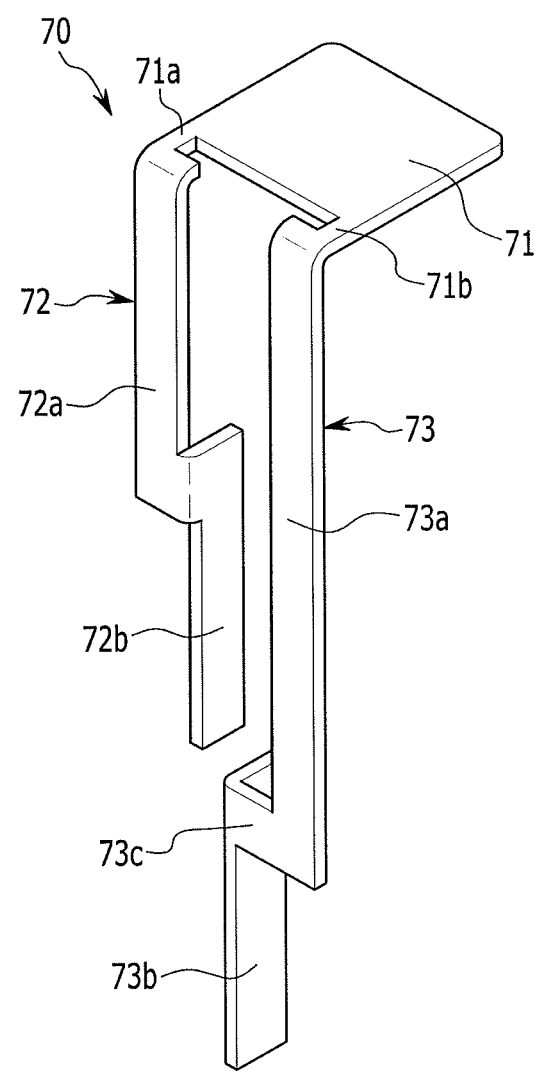
FIG. 4 illustrates a perspective view of the current collecting member according to another exemplary embodiment.

FIG. 4 illustrates a perspective view of a current collecting member according to another exemplary embodiment.

Referring to FIG. 4, the rechargeable battery according to the present exemplary embodiment has the same structure as the rechargeable battery according to the previous exemplary embodiment, except for the structure of a current collecting member 70 such that the overlapping description is not repeated.

The current collecting member 70 according to the present exemplary embodiment includes a terminal connection part 71 bonded at the connection terminal 25, a first current collecting piece 72 bent at the terminal connection part 71, continuing downwardly, and bonded to the negative uncoated region 11a of the first electrode assembly 10, and a second current collecting piece 73 bonded at the terminal connection part 71, continuing downwardly, and bonded to the negative uncoated region 11a of the second electrode assembly 20.

The terminal connection part 71 may be formed to have a quadrangular plate shape and may fixed to the lower portion of the connection terminal 25 by welding. The terminal connection part 71 may include a first fuse part 71a and a second fuse part 71b. The first fuse part 71a and the second fuse part 71b may be separately disposed.

The first fuse part 71a and the second fuse part 71b may have smaller cross-sections than other portions of the current collecting member 70 such that first fuse part 71a and the second fuse part 71b are melted if an overcurrent occurs. The first fuse part 71a may be positioned between the first current collecting piece 72 and terminal connection part 71, and the second fuse part 71b may be positioned between the second current collecting piece 73 and the terminal connection part 71. Accordingly, when an overcurrent occurs with respect to the first electrode assembly 10, the first fuse part 71a is melted, and when the overcurrent occurs with respect to the second electrode assembly 20, the second fuse part 71b is melted, thereby blocking the current.

The first current collecting piece 72 may be shorter than the second current collecting piece 73. The first current collecting piece 72 may be bonded to the first electrode assembly 10 positioned further closer to the cap plate 31. The first current collecting piece 72 may include a first side connection part 72a bent at the terminal connection part 71 and continuing downwardly, and a first electrode bonding part 72b bent at the first side connection part 72a and bonded to the negative uncoated region 11a of the first electrode assembly 10.

The first side connection part 72a may continue downwardly in the length direction end of the terminal connection part 71. In the state that the first electrode bonding part 72b is bent at a right angle to the first side connection part 72a and is disposed parallel to the negative uncoated region 11a of the first electrode assembly 10, the first electrode bonding part 72b may be bonded to the negative uncoated region 11a by ultrasonic welding, etc.

The second current collecting piece 73 may be longer than the first current collecting piece 72. The second current collecting piece 73 may be bonded to the second electrode assembly 20 positioned farther away from the cap plate 31. The second current collecting piece 73 may include a second side connection part 73a bent at the terminal connection part 71 and continuing downwardly, and a second electrode bonding part 73b connected to the second side connection part 73a and bonded to the negative uncoated region 11a of the second electrode assembly 20.

The second electrode bonding part 73b may be connected to the second side connection part 73a through a guide supporting part 73c. The guide supporting part 73c may protrude in a direction from the second side connection part 73a toward the first current collecting piece 72, and the guide supporting part 73c may be formed to be connected to the lower end of the second side connection part 73a.

The second side connection part 73a may be longer than the first side connection part 72a, and the guide supporting part 73c may be positioned farther down with respect to the lower end of the first electrode bonding part 72b. The guide supporting part 73c shifts the position of the second electrode bonding part 73b inside the case 26 such that the second electrode bonding part 73b contacts the negative uncoated region 11a of the second electrode assembly 20.

The second electrode bonding part 73b may be bent at the guide supporting part 73c to be parallel to the negative uncoated region 11a of the second electrode assembly 20, and may continue toward the bottom of the case. The second electrode bonding part 73b may be bonded to the negative uncoated region 11a of the second electrode assembly 20 by ultrasonic welding, etc.

Figure 5:
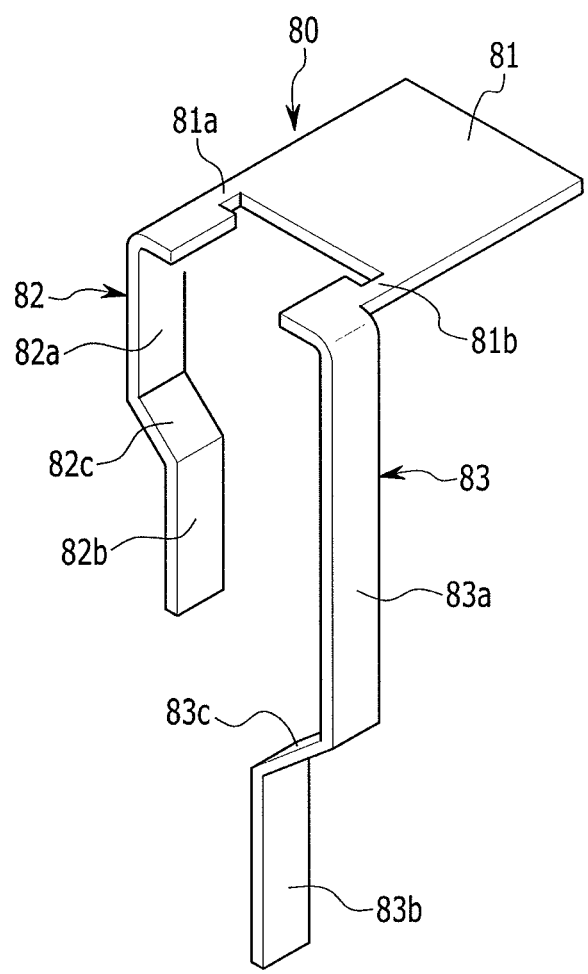
FIG. 5 illustrates a perspective view of the current collecting member according to another exemplary embodiment.

FIG. 5 illustrates a perspective view of a current collecting member according to another exemplary embodiment.

Referring to FIG. 5, a rechargeable battery according to the present exemplary embodiment has the same structure as the rechargeable battery according to the first exemplary embodiment except for the structure of a current collecting member 80 such that the overlapping description is not repeated.

The current collecting member 80 according to the present exemplary embodiment includes a terminal connection part 81 bonded to the connection terminal 25, a first current collecting piece 82 bent at the terminal connection part 81, continuing downwardly, and bonded to the negative uncoated region 11a of the first electrode assembly 10, and a second current collecting piece 83 bent at the terminal connection part 81, continuing downwardly, and bonded to the negative uncoated region 11a of the second electrode assembly 20.

The terminal connection part 81 may be formed to have a quadrangular plate shape and may be fixed to the lower portion of the connection terminal 25 by the welding. The terminal connection part 81 may include a first fuse part 81a and a second fuse part 81b. The first fuse part 81a and the second fuse part 81b may be separately disposed.

The first fuse part 81a and the second fuse part 81b may have smaller cross-sections than other portions of the current collecting member 80 such that they may be melted if an overcurrent occurs. The first fuse part 81a may be positioned between the first current collecting piece 82 and the terminal connection part 81, and the second fuse part 81b may be positioned between the second current collecting piece 83 and the terminal connection part 81. When an overcurrent occurs with respect to the first electrode assembly 10, the first fuse part 81a may be melted, and when the overcurrent occur with respect to the second electrode assembly 20, the second fuse part 81b may be melted, thereby blocking the current.

The first current collecting piece 82 may be bent toward the lower side at the width direction of one end of the terminal connection part 81, and the second current collecting piece 83 may be bent toward the lower side at the width direction of the other end of the terminal connection part 81. The first current collecting piece 82 and the second current collecting piece 83 may be disposed to be separated and face each other.

The first current collecting piece 82 may be shorter than the second current collecting piece 83. The first current collecting piece 82 may be bonded to the first electrode assembly 10 positioned to be closer to the cap plate 31. The first current collecting piece 82 may include a first side connection part 82a bent at the terminal connection part 81 and continuing downwardly, a guide supporting part 82c obliquely bent at the lower end of the first side connection part 82a, and a first electrode bonding part 82b bent at the guide supporting part 82c and bonded to the negative uncoated region 11a of the first electrode assembly 10.

The first side connection part 82a may be formed as a continuation extending toward the lower side from one end in the width direction of the terminal connection part 81. The first electrode bonding part 82b may be connected to the first side connection part 82a through the guide supporting part 82c. The guide supporting part 82c may be formed to be bent in the lower side with respect to the first side connection part 82a in the direction from the lower end of the first side connection part 82a toward a second side connection part 83a. In the state that the first electrode bonding part 82b is bent at the lower end of the guide supporting part 82c and disposed parallel to the negative uncoated region 11a of the first electrode assembly 10, the first electrode bonding part 82b may be bonded to the negative uncoated region 11a by ultrasonic welding, etc.

The second current collecting piece 83 may be longer than the first current collecting piece 82. The second current collecting piece 83 may be bonded to the second electrode assembly 20 positioned farther from away the cap plate 31. The second current collecting piece 83 may include a second side connection part 83a bent at the terminal connection part 81 and continuing downwardly, and a second electrode bonding part 83b connected to the second side connection part 83a and bonded to the negative uncoated region 11a of the second electrode assembly 20.

The second side connection part 83a may be formed as a continuation extending downwardly from the other end of the terminal connection part 81 in the width direction.

The second electrode bonding part 83b may be connected to the second side connection part 83a through the guide supporting part 83c. The guide supporting part 83c may be obliquely formed from the second side connection part 83a in the direction toward the first side connection part 82a from the lower end of the second side connection part 83a. In the state that the second electrode bonding part 83b is bent at the lower end of the guide supporting part 83c and disposed parallel to the negative uncoated region 11a of the second electrode assembly 20, the second electrode bonding part 83b may be bonded to the negative uncoated region 11a by ultrasonic welding. The second electrode bonding part 83b may be positioned under the lower end of the first electrode bonding part 82b.

By way of summation and review, a high power rechargeable battery using a non-aqueous electrolyte with a high energy density has been developed. The high power rechargeable battery is formed as a large capacity rechargeable battery by coupling a plurality of rechargeable batteries in series to use for driving a motor of a device, for example, an electric vehicle requiring large electric power.

Further, a battery module is generally formed with a plurality of rechargeable batteries that are coupled in series. A rechargeable battery may be formed in a cylindrical shape or a square shape.

When a conductive foreign material such as a nail, an awl, or the like, pierces a rechargeable battery from the outside, an internal short-circuit may occur in the rechargeable battery. When a short-circuit occurs, the temperature in the rechargeable battery may rapidly increase, thereby causing a fire or explosion in the rechargeable battery. Particularly, in the case of the high-capacity rechargeable battery, when the external short-circuit occurs, a large current may flow, risking fire or explosion in the rechargeable battery.

Embodiments provide a rechargeable battery with improved safety in a high-capacity rechargeable battery. According to embodiments, electrode assemblies are disposed in a battery to be separated from each other in a height direction. The lengths of a first current collecting piece and a second current collecting piece are different from each such that the different current collecting pieces may be attached to each electrode assembly separated in the height direction. Accordingly, even if a short circuit is generated in one electrode assembly, the overcurrent does not flow in the other electrode assembly, Accordingly, protection against a short-circuit may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery comprising:
a case having an inner space sealed by a cap plate at one end of the case;
a first electrode assembly inside the case;
a second electrode assembly inside the case;
a current collecting member including a first current collecting piece electrically connected to an electrode of the first electrode assembly and a second current collecting piece electrically connected to an electrode of the second electrode assembly, the electrode of the second electrode assembly having a same polarity as the electrode of the first electrode assembly; and
a first terminal electrically connected to the current collecting member and protruding outside the case,
wherein:
the first electrode assembly and the second electrode assembly are disposed with respect to each other in a height direction of the case, the height direction being a direction toward or away from the cap plate, such that the first electrode assembly is closest to the first terminal and the second electrode assembly is between the first electrode assembly and a bottom of the case, the bottom of the case being on an opposite side of the rechargeable battery from the cap plate,
the first current collecting piece and the second current collecting piece have different lengths,
the current collecting member includes a terminal connection part that connects the first current collecting piece and the second current collecting piece to the first terminal,
the first current collecting piece and the second current collecting piece are bent at the terminal connection part,
the terminal connection part includes a first fuse part and a second fuse part,
the first current collecting piece is connected to the terminal connection part with the first fuse part being between the first current collecting piece and the terminal connection part, the second fuse part not being between the first current collecting piece and the terminal connection part, and
the second current collecting piece is connected to the terminal connection part with the second fuse part being between the second current collecting piece and the terminal connection part, the first fuse part not being between the second current collecting piece and the terminal connection part.

2. The rechargeable battery as claimed in claim 1, wherein the first current collecting piece is shorter than the second current collecting piece.

3. The rechargeable battery as claimed in claim 1, wherein:
the first current collecting piece has a first electrode bonding part bonded to the first electrode assembly,
the second current collecting piece has a second electrode bonding part bonded to the second electrode assembly, and
the second electrode bonding part is positioned downward in the height direction from the first electrode assembly and the first electrode bonding part.

4. The rechargeable battery as claimed in claim 1, wherein the first current collecting piece includes:
a first side connection part bent at the terminal connection part, and
a first electrode bonding part bent at one side end of the first side connection part and bonded to the first electrode assembly by welding.

5. The rechargeable battery as claimed in claim 1, wherein the second current collecting piece includes:
a second side connection part bent at the terminal connection part,
a lead supporting part bent at a side end of the second side connection part,
a guide supporting part protruding in a direction toward the first current collecting piece at a lower end of the lead supporting part, and
a second electrode bonding part bent at a side end of the guide supporting part and bonded to the second electrode assembly.

6. The rechargeable battery as claimed in claim 1, wherein the second current collecting piece includes:
a second side connection part bent at the terminal connection part,
a guide supporting part protruding in a direction toward the first current collecting piece at the second side connection part, and
a second electrode bonding part bent at the guide supporting part and bonded at the second electrode assembly.

7. The rechargeable battery as claimed in claim 1, wherein the first current collecting piece includes:
a first side connection part bent at the terminal connection part and continuing downwardly,
a guide supporting part obliquely bent at a lower end of the first side connection part in a lower side, and
a first electrode bonding part bent at a lower end of the guide supporting part and bonded to the first electrode assembly.

8. The rechargeable battery as claimed in claim 7, wherein the second current collecting piece includes:
a second side connection part bent downwardly at the terminal connection part,
a guide supporting part obliquely bent at the lower end of the second side connection part in the lower side, and
a second electrode bonding part bent at the lower end of the guide supporting part and bonded to the second electrode assembly.

9. The rechargeable battery as claimed in claim 8, wherein the first current collecting piece and the second current collecting piece face each other.

* * * * *